(12) United States Patent
Aoki (10) Patent No.: US 7,427,335 B2
(45) Date of Patent: Sep. 23, 2008

(54) CLEANING DEVICE OF BAND-LIKE APPARATUS

(75) Inventor: Mitsuo Aoki, Shizuoka (JP)

(73) Assignee: Aoki Machinery Co., Ltd., Fuji (JP)

( * ) Notice: Subject to any disclaimer, the term of this patent is extended or adjusted under 35 U.S.C. 154(b) by 449 days.

(21) Appl. No.: 10/543,207

(22) PCT Filed: Aug. 19, 2003

(86) PCT No.: PCT/JP03/10462

§ 371 (c)(1),
(2), (4) Date: Jul. 22, 2005

(87) PCT Pub. No.: WO2005/017255

PCT Pub. Date: Feb. 24, 2005

(65) Prior Publication Data

US 2006/0124267 A1    Jun. 15, 2006

(51) Int. Cl.
*D21G 3/00* (2006.01)
(52) U.S. Cl. .................. 162/272; 162/274; 162/275; 134/95.3
(58) Field of Classification Search ............... 162/272, 162/274, 275; 134/95.3
See application file for complete search history.

(56) References Cited

U.S. PATENT DOCUMENTS 4,474,644 A * 10/1984 Poulsen .............. 162/199

FOREIGN PATENT DOCUMENTS

| DE | 4035411 | * 5/1992 |
|---|---|---|
| JP | 05-504604 | 7/1993 |
| JP | 2001-064891 | 3/2001 |
| WO | 92/13132 | 8/1992 |

* cited by examiner

*Primary Examiner*—Mark Halpern
(74) *Attorney, Agent, or Firm*—Ladas & Parry LLP

(57) ABSTRACT

Described is a cleaning device for a band-like apparatus. It comprises a hollow rotatable roll supported to turn in the traveling direction of the band-like apparatus. The roll has a plurality of apertures formed in it, and cleaning fluid jet nozzles arranged at the inner side of the plurality of apertures. The cleaning device cleans the band-like apparatus by spraying a cleaning fluid re-at the band-like apparatus from the cleaning fluid jet nozzles. The cleaning device also comprises a plurality of blade plates.

11 Claims, 10 Drawing Sheets

CLEANING DEVICE OF BAND-LIKE APPARATUS

This application is a 371 of PCT/JP03/10462 filed 19 Aug. 2003

BACKGROUND OF THE INVENTION

1. Technical Field

The present invention relates to a cleaning device of band-like apparatus for a paper machine being a paper manufacturing appliance, the band-like apparatus being used in a wire part, a press part and a dry part in a paper making stroke.

2. Background Art

In general a paper manufacturing appliance, for example, a paper machine pours a pulp suspension being a raw material onto a wire belt and thereby performs a dehydrating process, transfers a sheet-shaped pulp fiber obtained by the dehydrating process onto a press belt in a press part, removes water contained in the pulp fiber through a pressing process and thereby produces a wet paper web. And in a dry part, it transfers the wet paper web obtained in the press part onto a canvas belt and further evaporates moisture therein.

In such a paper making stroke, foreign materials are stuck on the surface of a band-like apparatus such as a wire belt, a press belt, a canvas belt and the like, namely, on the surface of a band-like cleaning object, and these foreign materials are generally natural resin or gum material extricated from wood, pulp, paper and the like, and further non-water-soluble adhesive materials having such organic matter as additive chemicals and the like used in a paper making stroke as the main ingredient. And these foreign materials are minute adhesive materials being present on a wet paper web in a dry part for example, and are made viscous by heating and stuck on the surface of a canvas belt or a roll.

As a result, these adhesive materials receive pressure of paper, a dryer roll and the like from the surface of the canvas, come into and deposit in the inside of the canvas, and cause the degree of ventilation of the canvas to decrease. And the adhesive materials which have expanded and grown on the surface of the canvas adhere again or fall from the roll to the canvas and from the canvas to paper. As the result, there has been problems that stains or dents produced on the surface of the canvas cause breaking or defects of paper and cause the degradation in quality or productivity due to troubles such as deterioration in quality or in productivity caused by breaking of paper and the like.

Thereupon, as disclosed in Japanese Patent Laid-Open Publication No. 5-504604 for example, there has been disclosed a method of providing an air blowing-off nozzle and a water jet device along a wire belt, blowing off an air flow against a band-like cleaning object from the nozzle, feeding water from the water jet device and thereby forming a water film on the inner face of wire, blowing away and sucking foreign materials through taking them in water by the air flow blown off from the air blowing-off nozzle, collecting the foreign materials in a hood and thus cleaning the wire belt.

However, an air blowing-off nozzle needs to be arranged at a distance from the surface of a band-like cleaning object so as not to touch and damage the band-like cleaning object, and since a high-pressure cleaning fluid jetted from a water jet device exerts a large pressure on the band-like cleaning object, the water jet device and the cleaning object have needed to be arranged at a more distance from each other.

As a result, a cleaning object and a device such as a nozzle or the like cannot be made close to each other, and in order to secure a certain cleaning capability the jet pressure to the cleaning object must be made high, and therefore the capability of the jet device has needed to be increased by increasing the jet pressure and the like. Due to this, the band-like cleaning object is liable to be damaged by a large jet pressure exerted on the band-like cleaning object, and since the band-like cleaning object needs to be more frequently replaced and the amount of cleaning fluid (air, water and the like) used is increased, there has been a problem that such a method leads to the increase in manufacturing cost and in running cost.

Therefore, the present inventor has proposed a cleaning device arranging a cleaning fluid jetting nozzle inside a hollow rotating roll and cleaning a band-like cleaning object through an aperture for shower formed in the rotating roll from the jet nozzle. However, this cleaning device has only provided a plurality of apertures for shower at a certain pitches in the roll axis direction of the rotating roll along the roll rotating direction, but has not been made to completely clean away dirt such as foreign materials and the like from the band-like cleaning object by effectively utilizing the shape of an aperture for shower, a rotating roll and the like. As a result, it has been unsatisfactory from the viewpoint of the degree of cleaning of a band-like cleaning object.

Thereupon, an object of the invention is to provide a cleaning device of a band-like apparatus, being made so as to clean away foreign materials before the foreign materials become huge on the surface of a band-like cleaning object without scattering the foreign materials around by improving a cleaning structure such as the shape of an aperture for shower and the like for the band-like cleaning object, in consideration of the above-described points.

DISCLOSURE OF THE INVENTION

In order to achieve the above-described object, the present invention is attained by a cleaning device of a band-like apparatus, comprising a hollow rotating roll being supported so as to be capable of turning along the traveling direction of the band-like apparatus and having a plurality of apertures for shower formed in it, and cleaning fluid jetting nozzles arranged at the inner side of the plurality of apertures for shower within an embracing angle of the band-like apparatus wound partially round the rotating roll, the cleaning device cleaning the band-like apparatus by jetting a cleaning fluid to the band-like apparatus from the cleaning fluid jetting nozzles, wherein the cleaning device comprises a plurality of blade plates being adjacent in parallel with the roll axis of the rotating roll in the traveling direction of the band-like apparatus and provides the plurality of blade plates and the rotating roll so as to be capable of freely reciprocating in the roll axis direction.

And the above object is effectively attained by arranging a plurality of blade plates in parallel with the roll axis of the rotating roll and forming a plurality of projected portions and depressed portions at specified pitches at the contact side with the band-like apparatus in each of the blade plates.

And the above object is effectively attained by forming projected and depressed portions at the contact side with the band-like apparatus in each blade plate.

And the above object is effectively attained by using three blade plates and forming projected and depressed portions at blade projection pitches of 20 to 40 mm.

And the above object is effectively attained by forming apertures for shower out of a plurality of long and narrow opening holes formed in the rotating roll and providing a plurality of slits formed so as to intersect the opening holes.

And the above object is effectively attained by arranging three parallel slits in an inclined direction relative to the longitudinal direction of the apertures for shower as a plurality of slits.

And the above object is effectively attained by making a plurality of slits cross one another in the shape of X relative to the longitudinal direction of the apertures for shower.

And the above object is effectively attained by forming a band-like apparatus out of a roll for felt in a press part of a paper making stroke and setting the width of a slit in a range of 8 to 12 mm.

Further, the above object is effectively attained by forming the band-like apparatus out of a roll for canvas in a dry part of a paper making stroke and setting the width of a slit in a range of 20 to 22 mm.

DETAILED DESCRIPTION OF PREFERRED EMBODIMENTS

Disclosed is a band-like apparatus cleaning device for removing foreign materials and cleaning the band-like apparatus before the foreign materials become significant on the surface of the band-like apparatus. Described is a cleaning device for a band-like apparatus, comprising a hollow rotating roll supported so as to turn along the traveling direction of the band-like apparatus. The roll has a plurality of apertures with cleaning fluid jet nozzles arranged at the inner side of the plurality of apertures to shower the band-like apparatus. The cleaning device cleans the band-like apparatus by jetting cleaning fluid at the band-like apparatus from the cleaning fluid jet nozzles. The cleaning device also comprises a plurality of blade plates located adjacent to the roll axis of the rotating roll. The plurality of blade plates are able to freely reciprocate in the roll axis direction.

A band-like apparatus cleaning device according to the present invention is described in detail with reference to the drawings in the following.

Figure 1A:
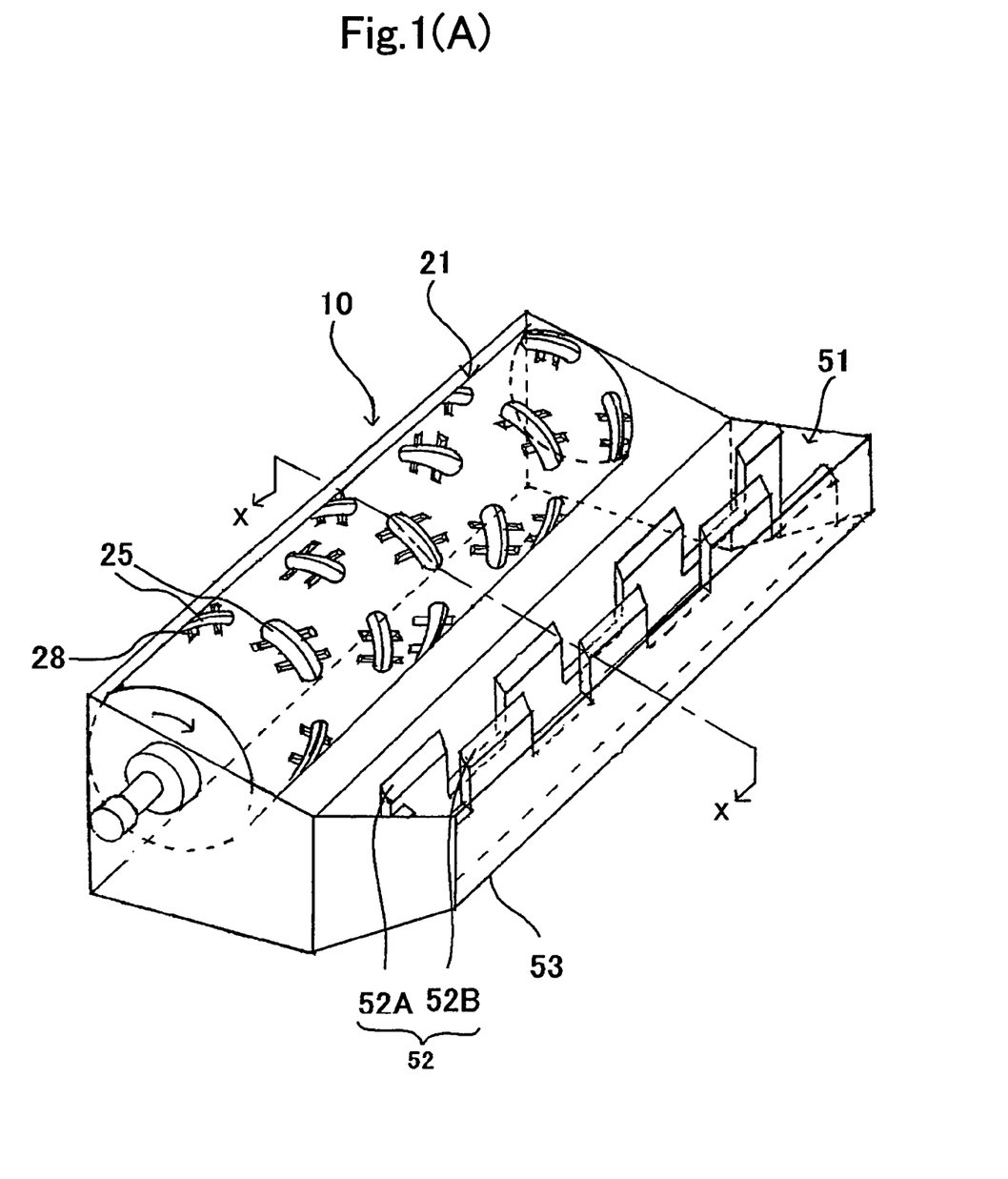
FIG. 1(A) is a schematic perspective view of a cleaning device of a band-like apparatus according to the present invention.
Figure 1B:
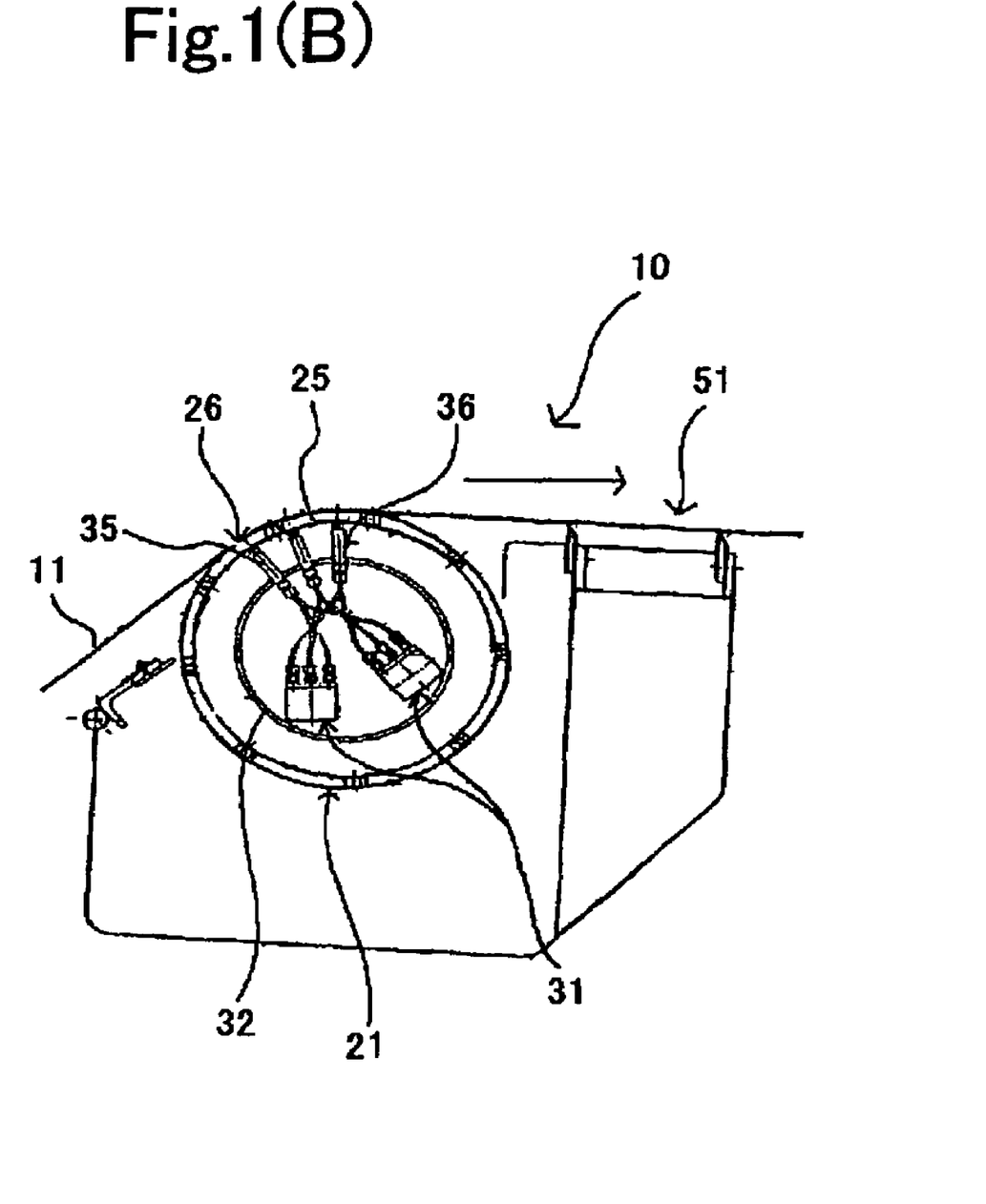
FIG. 1(B) is a sectional view taken along line X-X of FIG. 1(A).
Figure 2:
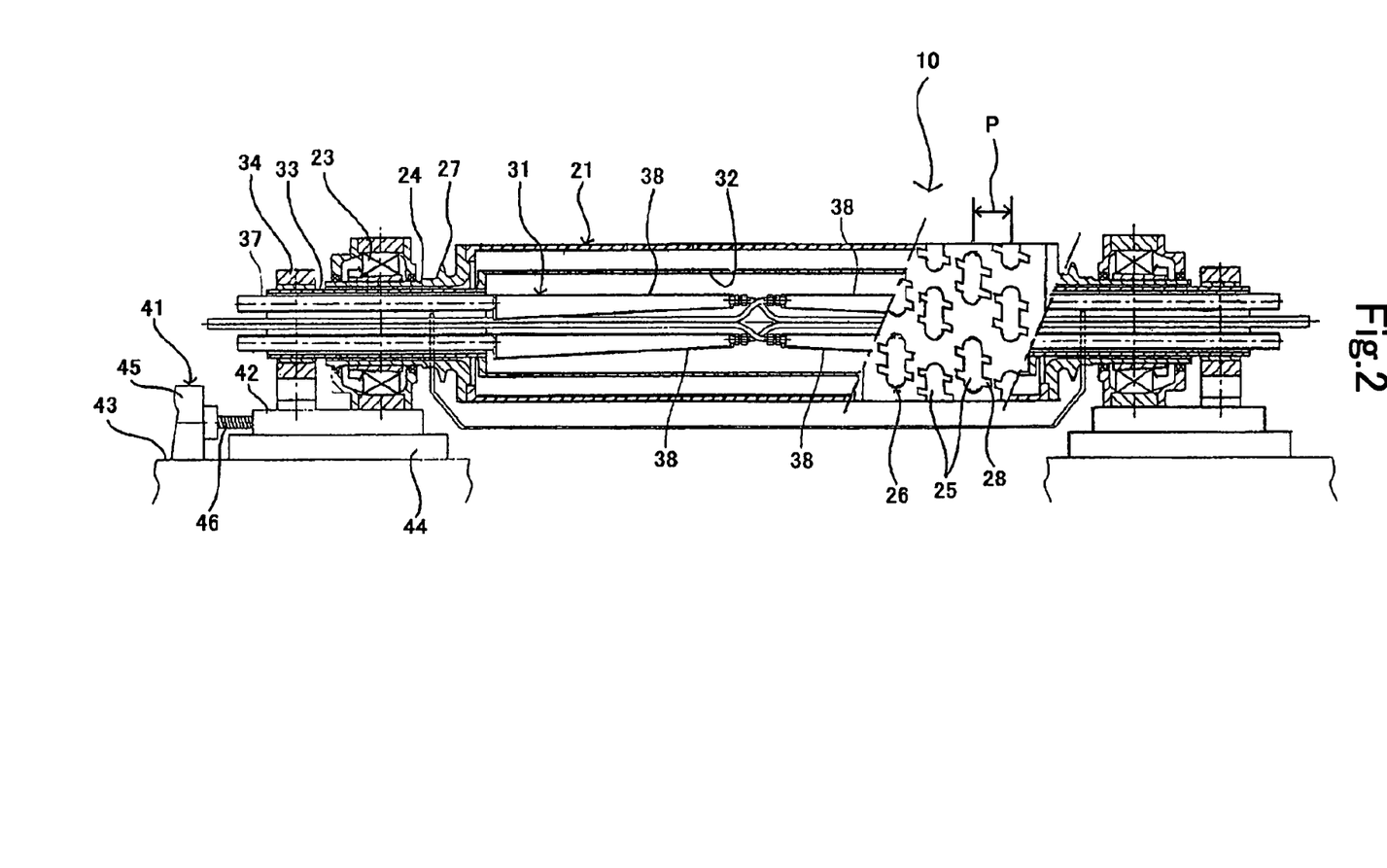
FIG. 2 is a partially sectional view taken along the axial direction of a cleaning device of a band-like apparatus from which cleaning device a blade device is removed.

FIG. 1(A), FIG. 1(B) and FIG. 2 show a rough configuration of a band-like apparatus cleaning device 10, and the band-like apparatus cleaning device 10 is mainly composed of a hollow rotating roll 21, a cleaning fluid jetting device 31, a sliding device 41 and a blade device 51. This band-like apparatus cleaning device 10 is provided in each of a wire part, a press part and a dry part in a paper making stroke, and is made so as to clean away foreign materials such as an adhesive material, fiber and the like stuck on a band-like apparatus 11 such as a wire belt, a press belt, a canvas belt and the like.

And as shown in FIG. 2, the hollow rotating roll 21 supports a hollow supporting shaft 24 so as to be capable of freely turning by means of bearings 23 mounted on left and right sliding stands 42 of the sliding device 41. And the hollow rotating roll 21 rotates in the traveling direction of the band-like apparatus 11 (direction of arrow in FIG. 1(A)) in a state of having the band-like apparatus wound partially round the hollow rotating roll 21, the band-like apparatus being given a specific tension, and has a number of apertures for shower 25 formed along the circumferential direction. At this time, the hollow rotating roll 21 is provided with a plurality of apertures for shower 25 formed along the roll rotating direction at certain pitches P in the axial direction of the roll.

Hereupon, the hollow rotating roll 21 is provided with a cutwater ring 27 more inside (at the roll side) than the bearing 23 supporting the hollow supporting shaft 24 and thereby prevents lubricant of the bearing 23 and the like from being splashed over the band-like apparatus 11 wound partially round the hollow rotating roll 21.

Although the hollow rotating roll 21 may be forcibly driven, it may be turned being dragged by the band-like apparatus 11 moving in its traveling direction with a certain slippage relative to the band-like apparatus 11.

As a material for the hollow rotating roll 21, special stainless steel is adopted, but any kind of materials being proof against a high-temperature and high-humidity environment in a dry part and being rich in corrosion resistance may be used.

And the cleaning fluid jetting device 31 has a fixed roll 32 arranged so as to have a certain space inside the hollow rotating roll 21 and is fixed through a hollow supporting shaft 33 by a supporting stand 34 mounted on a sliding stand 42 of the sliding device 41. A cleaning fluid jetting nozzles 35 is attached to the fixed roll 32 within an embracing angle of the band-like apparatus wound partially round the hollow rotating roll 21 and is arranged closely to and at the inner side of an aperture for shower 25.

In such a way, by arranging a cleaning fluid jetting nozzle closely to an aperture for shower 25, it is possible to decrease a fluid jet pressure necessary for keeping a certain cleaning capability and also reduce the amount of cleaning fluid used. Decrease of a fluid jet pressure prevents wear and clogging of a cleaning fluid jetting nozzle 35 and thereby makes it possible to prolong the life of the band-like apparatus cleaning device 10. Further, in a cleaning fluid jetting device 31 at this time, nozzle groups 36 each being composed of a plurality of cleaning fluid jetting nozzles 35 are file-arranged along the longitudinal direction of each aperture for shower 25 (aperture group 26) at each pitch P corresponding to each aperture for shower 25 (aperture group 26) of the hollow rotating roll 21 in the roll axis direction of the hollow rotating roll 21.

And the cleaning fluid jetting device 31 inserts cleaning fluid jetting tubes 37 into the fixed roll 32 from an opening of the hollow supporting shaft 33 and connects cleaning fluid jetting heads 38 composed of square tubes and the like to these cleaning fluid jetting tubes 37, and a plurality of cleaning fluid jetting nozzles 35 are connected in the longitudinal direction of the cleaning fluid jetting heads 38. This cleaning fluid jetting head 38 extends from the left or right end of the fixed roll 32 to the middle part of the fixed roll 32. And the fluid jet pressure from a cleaning fluid jetting nozzle 35 connected to each position in the longitudinal direction of each cleaning fluid jetting head 38 is made to be equal to each other in the longitudinal direction of each cleaning fluid jetting head 38 by reducing gradually the cross-sectional area of each cleaning fluid jetting nozzle 38 as being closer from the left or right end of the fixed roll 32 to the middle of the fixed roll 32, and the like.

And the sliding device 41 is made so as to mount a sliding stand 42 on guide rails 44 extending in the axial direction of the hollow rotating roll 21, the rails being provided on a stand 43 and let this sliding stand 42 support the hollow rotating roll 21 and the cleaning fluid jetting device 31. This sliding device 41 is made so as to screw-engage a feed screw 46 to be driven by a motor 45 supported by the stand 43 with the sliding stand 42 and make the hollow rotating roll 21 and the cleaning fluid jetting device 31 reciprocate within a range exceeding the pitch P of the aperture group 26 and nozzle group 36 as one body in the roll axis direction of the hollow rotating roll 21 by turning the motor 45 forward and backward.

Figure 3:
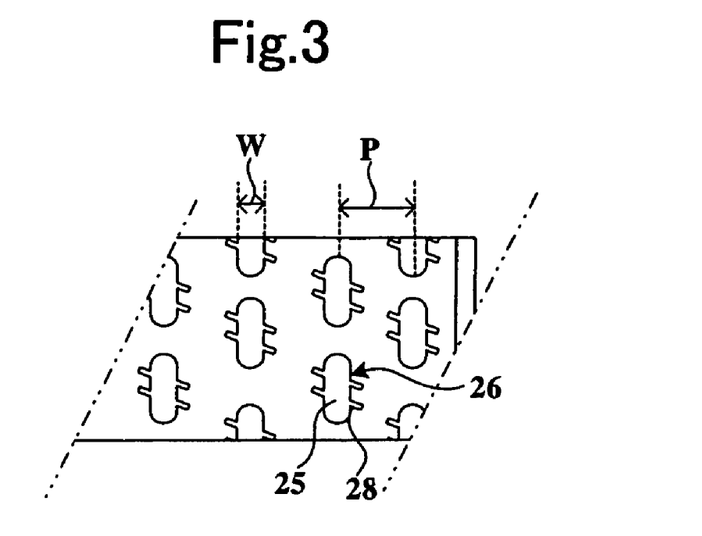
FIG. 3 is a figure showing a plurality of apertures for shower formed in the surface of a rotating roll.
Figure 4:
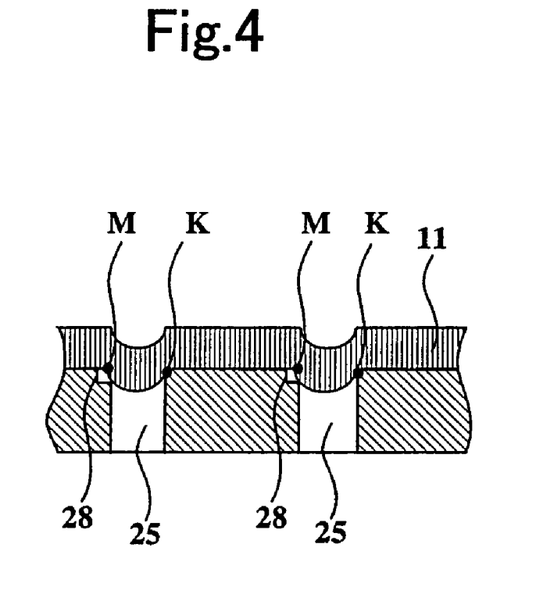
FIG. 4 is a sectional view taken along line Y-Y of FIG. 3.
Figure 5:
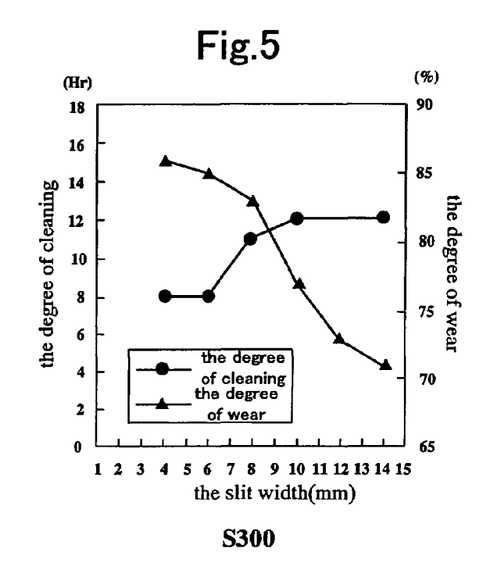
FIG. 5 is a graph showing the relation between the slit width of an aperture for shower and the degrees of cleaning and wear in a rotating roll for press of S300.
Figure 6:
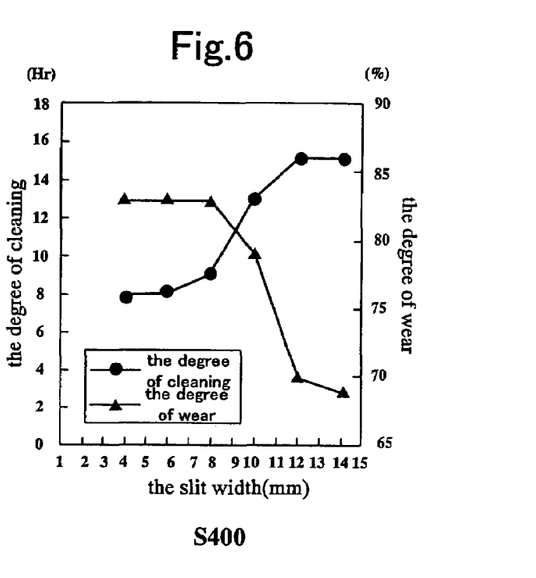
FIG. 6 is a graph showing the relation between the slit width of an aperture for shower and the degrees of cleaning and wear in a rotating roll for press of S400.
Figure 7:
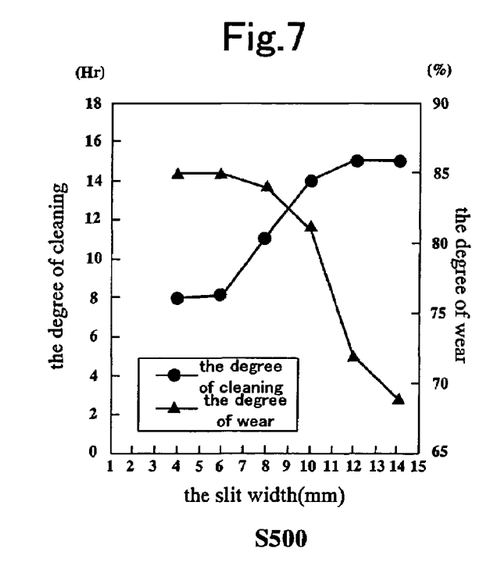
FIG. 7 is a graph showing the relation between the slit width of an aperture for shower and the degrees of cleaning and wear in a rotating roll for press of S500.
Figure 8:
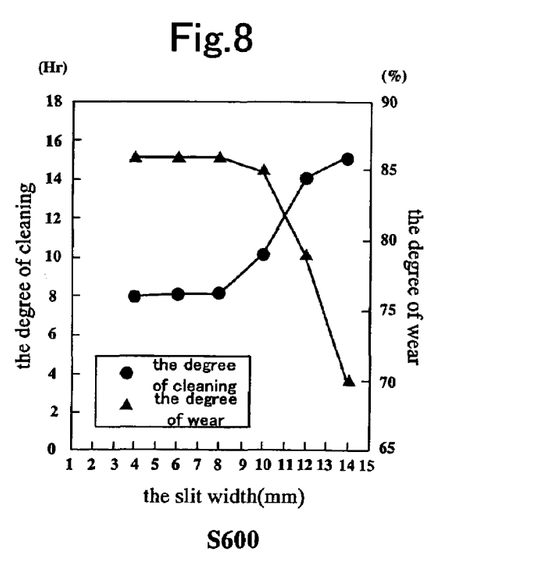
FIG. 8 is a graph showing the relation between the slit width of an aperture for shower and the degrees of cleaning and wear in a rotating roll for press of S600.
Figure 9:
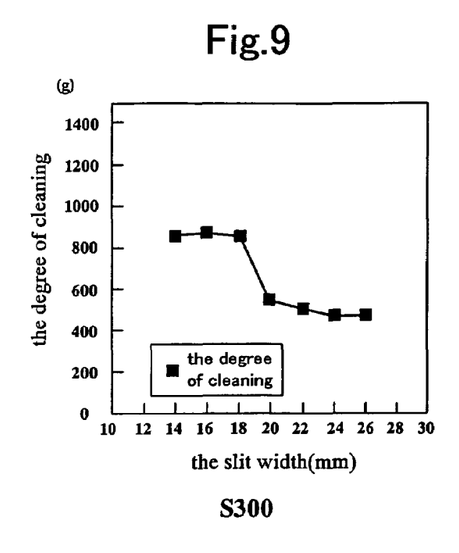
FIG. 9 is a graph showing the relation between the slit width of an aperture for shower and the degree of cleaning in a rotating roll for canvas of S300.
Figure 10:
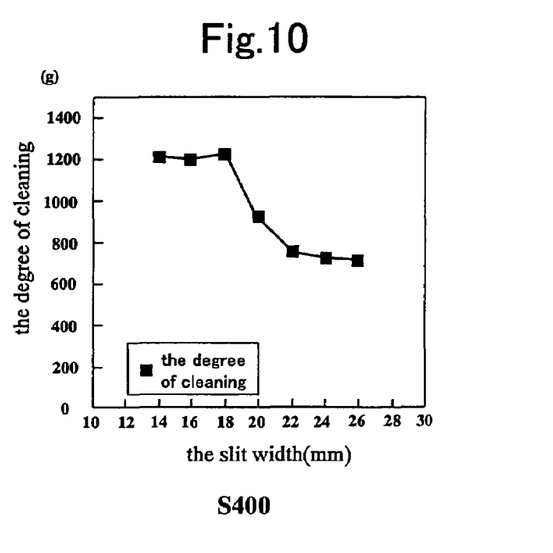
FIG. 10 is a graph showing the relation between the slit width of an aperture for shower and the degree of cleaning in a rotating roll for canvas of S400.
Figure 11:
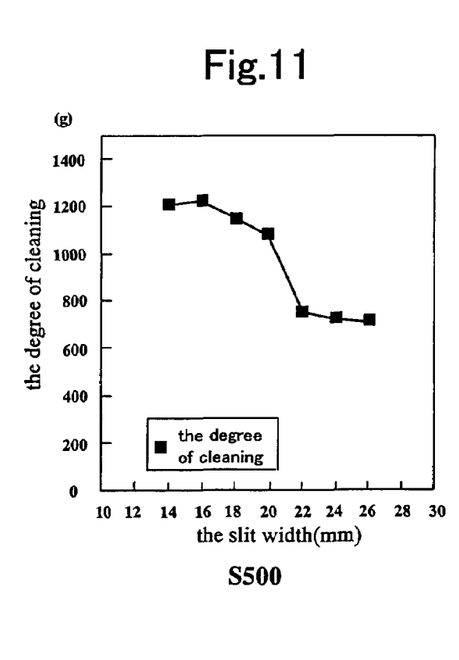
FIG. 11 is a graph showing the relation between the slit width of an aperture for shower and the degree of cleaning in a rotating roll for canvas of S500.
Figure 12:
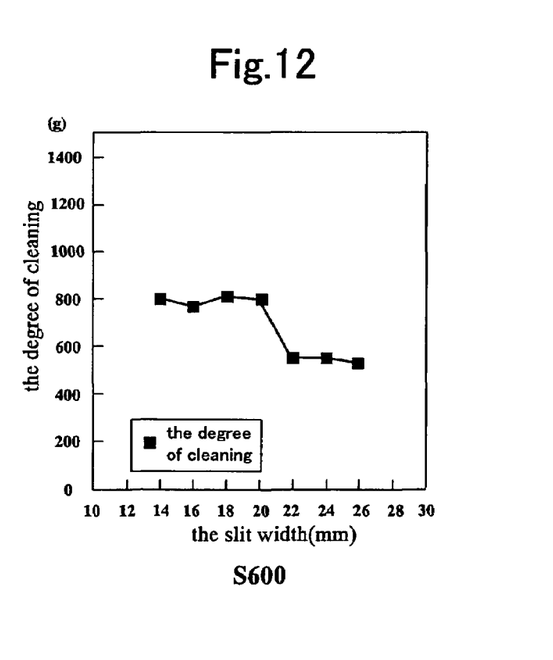
FIG. 12 is a graph showing the relation between the slit width of an aperture for shower and the degree of cleaning in a rotating roll for canvas of S600.

And as shown in FIG. 3, an aperture for shower 25 of the hollow rotating roll 21 is formed into a long and narrow shape and two parallel slit portions 28 are provided so as to intersect the aperture for shower 25. Since the slit portions 28 are pushed into the band-like apparatus 11 due to such shock as vibration or the like in a process in which the band-like apparatus 11 is traveling on the roll surface of the hollow rotating roll 21, the band-like apparatus 11 comes to move in a zigzag direction. As a result, foreign materials which have come into the inside (minute gaps between warp and woof) of the band-like apparatus 11 result in, as shown in FIG. 4, being rubbed and kneaded out by so-called rubbing and kneading action at point M and then being scraped away to the outside by so-called scraping-away action at point K. That is to say, thanks to these two actions (rubbing and kneading action and scraping-away action), the band-like apparatus 11 can extend gaps between warp and woof, collect foreign materials being about to come into the inside of the band-like apparatus 11 on the surface of the band-like apparatus 11 and thereby remove a more amount of foreign materials.

Due to this, it is possible to improve the degree of ventilation of the band-like apparatus 11, prolong the life of the band-like apparatus 11, reduce a troublesome maintenance work by reducing the frequency of replacing periodically the band-like apparatus 11, and reduce the labor cost and the running cost. And since the degree of ventilation is improved, it is possible to make the water of a wet paper web exhale sufficiently through meshes of the band-like apparatus 11 and increase the drying efficiency of paper.

In this case, since when the width W of an aperture for shower 25 is made broader the band-like apparatus 11 comes to be more liable to move in a zigzag direction and more liable to receive a rubbing and kneading action and a scraping-away action, it is possible to remove more foreign materials from the surface of the band-like apparatus 11. In the present invention, therefore, experiments were performed with regard to the relation between the aperture for shower 25 and the degree of cleaning.

First, varying the diameter (face length) of a hollow rotating roll 21, experiments were performed using rolls for press and canvas with regard to the relation between the slit width of an aperture for shower 25 and the degrees of cleaning and wear of a band-like apparatus. As a result, with regard to a roll for press, as shown in FIGS. 5 to 8, it has been found that the degrees of cleaning and wear are the most preferable in comprehensive evaluation in case of 8 mm in slit width in S300, in case of 10 mm in slit width in S400, in case of 10 mm in slit width in S500, and in case of 12 mm in slit width in S600. On the other hand, with regard to a roll for canvas, as shown in FIGS. 9 to 12, in consideration of the machining cost of the roll, it has been found that the degree of cleaning is the most preferable in case of 20 mm in slit width in S300 and S400, and in case of 22 mm in slit width in S500 and S600. In a word, from the viewpoint of degree of cleaning, it has been found that it is preferable to set the slit width in a range of 8 to 12 mm with regard to a roll for press and set the slit width in a range of 20 to 22 mm with regard to a roll for canvas.

That is to say, the degree of cleaning was 11 hours and the degree of wear was 83% in case of 8 mm in slit width using S300 with regard to a roll for press. And the degree of cleaning was 13 hours and the degree of wear was 79% in case of 10 mm in slit width using S400. And the degree of cleaning was 14 hours and the degree of wear was 81% in case of 10 mm in slit width using S500. And the degree of cleaning was 14 hours and the degree of wear was 79% in case of 12 mm in slit width using S600. On the other hand, with regard to a roll for canvas, the amount of adhesive foreign materials stuck therein being an index of the degree of cleaning was 540 g in case of 20 mm in slit width using S300, the amount of adhesive foreign materials stuck therein was 920 g in case of 20 mm in slit width using S400, the amount of adhesive foreign materials stuck therein was 750 g in case of 22 mm in slit width using S500, and the amount of adhesive foreign materials stuck therein was 550 g in case of 22 mm in slit width using S600.

Hereupon, "S300" is a band-like apparatus cleaning device of 314 mm in roll diameter and 1500 mm to 3400 mm in roll surface length, "S400" is a band-like apparatus cleaning device of 400 mm in roll diameter and 3500 mm to 4900 mm in roll surface length, "S500" is a band-like apparatus cleaning device of 500 mm in roll diameter and 5000 mm to 6200 mm in roll surface length, and "S600" is a band-like apparatus cleaning device of 600 mm in roll diameter and 6300 mm to 7400 mm in roll surface length.

Figure 13:
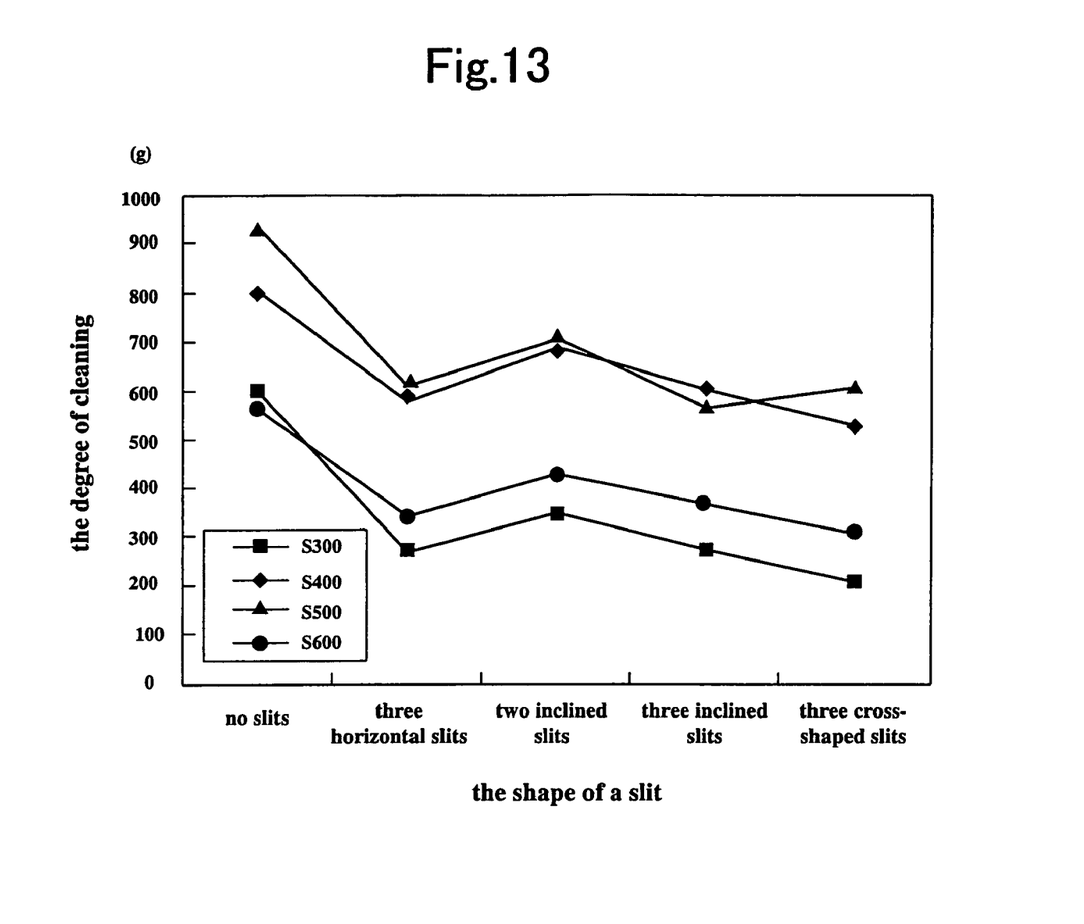
FIG. 13 is a graph showing the relation between the shape of a slit and the degree of cleaning.

Next, experiments with regard to the relation between the shape of a slit and the degree of cleaning were performed varying the slits in shape. As a result, as shown in FIG. 13, an aperture for shower provided with three cross-shaped slits was the best in cleaning performance in S300, S400 and S600, while an aperture for shower provided with three inclined slits was the best in cleaning performance in S500.

By this, it is possible to jet a cleaning fluid jettingted from cleaning fluid jetting nozzles 35 connected to cleaning fluid jetting heads 38 at positions where the cleaning fluid jetting nozzles correspond to a nozzle group 36 to which the respective cleaning fluid jetting nozzles belong from apertures for shower 25 of the hollow rotating roll 21 to a band-like apparatus 11 by a cleaning fluid jetting device 31, while making the cleaning fluid jetting device 31 and the hollow rotating roll 21 reciprocate as one body in the roll axis direction.

Accordingly, it is possible to clean a band-like apparatus 11 over the whole width of it, and to make the steam being a cleaning fluid jetted from a cleaning fluid jetting device 31 remove and collect foreign materials from the inside of the band-like apparatus 11 on the surface of the band-like apparatus 11. And since it is possible to clean the band-like apparatus 11 over the whole width of it and remove foreign materials, the moisture profile of paper is made stable. That is to say, no undried portion appears in a sheet of paper and paper being good in quality is obtained.

And as shown in FIG. 1(A), a blade device 51 is provided with two blade plates 52, and a save-all 53 is provided under the blade plates 52. Light fibers (paper powder) and the like are made to fall in the save-all 53 at the entrance side of a blade portion 54 but foreign materials stuck on the band-like apparatus 11 which have not been made to fall even by slit portions 28 of apertures for shower 25 of the hollow rotating roll 21 as described above are scraped away by the blade plates 52.

This blade device 51 scrapes away foreign materials stuck on the surface of the band-like apparatus 11 by pressing the edges 55 of the blade plates 52 against the surface of the band-like apparatus 11 at a certain pressure. The scraped-away foreign materials stay on the surface of the band-like apparatus 11 pressed by the edges 55, adhere to one another at the back side of the edges 55 of the blades 52, and expand and grow in the shape of a strip of paper. Therefore, it is possible to securely remove the foreign materials stuck on the surface of the band-like apparatus 11 without scattering them around. And the band-like apparatus 11 is not worn by the scraping of the blades 52, and further the warp of the band-like apparatus 11 is not degraded in strength.

Figure 14:
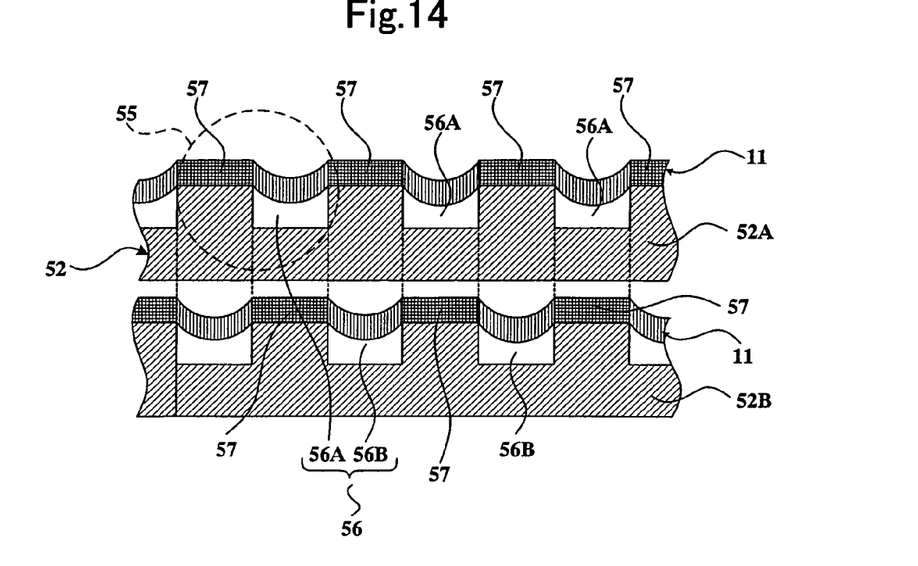
FIG. 14 is a figure showing the shape of a blade plate according to the invention.

As shown in FIG. 14, the edge of a blade plate 52 has a shape capable of efficiently expanding and growing foreign materials into the shape of a strip of paper, namely, the two blade plates 52A and 52B have notches 56A and 56B corresponding to pitches P of the apertures for shower 25 of the hollow rotating roll 21, and the two blade plates 52A and 52B are mounted so that these notches 56A and 56B are arranged alternately zigzag.

Due to this, when a band-like apparatus cleaning device 10 operates, if it is a flat single plate having no notch, the whole device vibrates and a band-like apparatus 11 is made wavy and results in vibrating up and down in a process of carrying the band-like apparatus 11, and parts where the band-like apparatus 11 comes into contact with and no contact with the blade plates 52 appear. As a result, parts from which foreign materials are scraped away and not scraped away by the blade plates 52 appear, but by providing such notches in the blade plates 52, the band-like apparatus 11 is made to come into contact with the blade plates at locations 57 without fail.

Therefore, by installing blade plates 52 so that notches 56A and 56B of the blade plates 52A and 52B are alternately arranged, it is possible to bring the blade plates 52 uniformly into contact with the whole surface of the band-like apparatus 11. And by providing such notches in the blade plates 52, it is possible to concentrate the actions of heat and contact pressure at the contact parts between the edges 55 of the blade plates 52 and the band-like apparatus 11, efficiently expand and grow foreign materials, remove the expanded and grown foreign materials in a state where they are formed into a strip shape, collect the foreign materials in a state where they are scattered in the save-all 53, and prevent a drainpipe of the save-all 53 from getting clogged.

Figure 15:
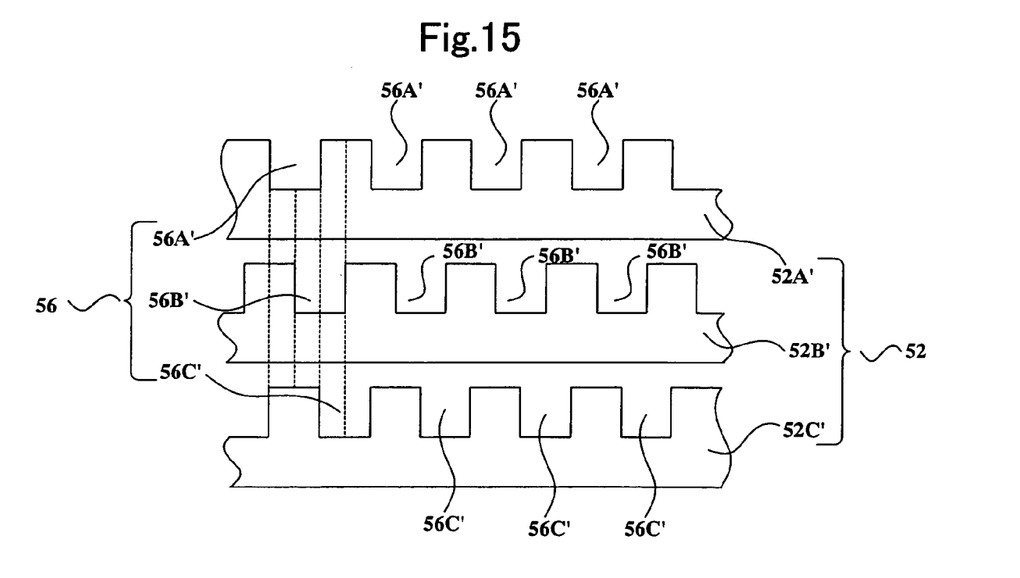
FIG. 15 is a front view of a blade plate being a variation example of the invention.

And a blade device 51 of a band-like apparatus cleaning device 10 according to the invention is not limited to the case of providing two blade plates 52A and 52B as described above, but may be provided with three blade plates 52A', 52B' and 52C' at specified pitches, as shown in FIG. 15 for example. That is to say, it is enough to provide a plurality of blade plates 52 so that they form a flat single plate having no notches when they are superposed one over another.

Figure 16:
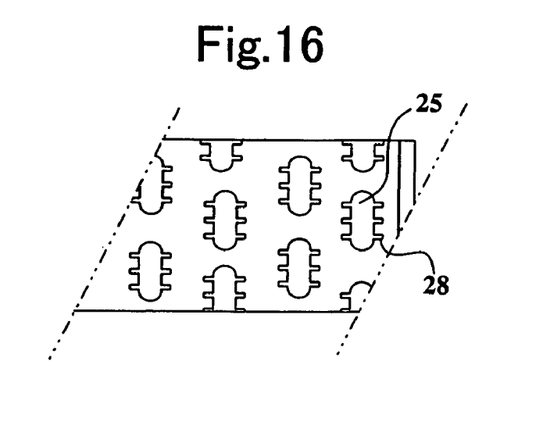
FIG. 16 is a partial plan view of a rotating roll being a variation example of the invention.
Figure 17:
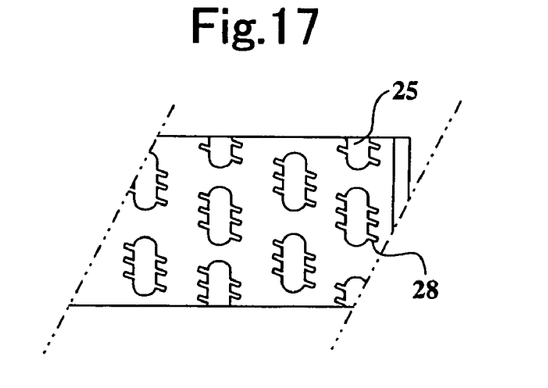
FIG. 17 is a partial plan view of a rotating roll being a variation example of the invention.
Figure 18:
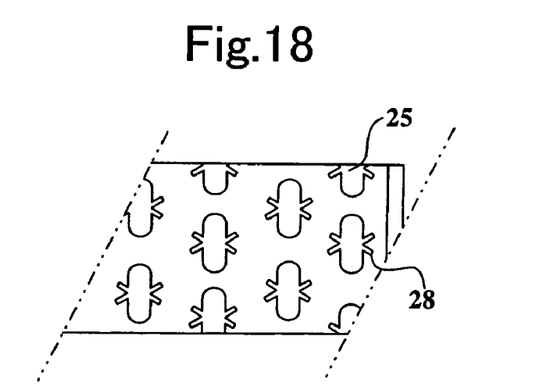
FIG. 18 is a partial plan view of a rotating roll being a variation example of the invention.

And the shapes of apertures for shower 25 and slit portions 28 are not limited to the shapes as described above, but such shapes as the pitch, width and length of an aperture for shower 25 and the number of slits and the like may be determined depending on a kind of the band-like apparatus 11 and an embracing angle of the band-like apparatus 11 wound partially round the hollow rotating roll 21, and the shape of them may be, for example, a shape where three slit portions 28 are provided perpendicularly to the longitudinal direction of an aperture for shower 25 as shown in FIG. 16, a shape where three parallel slit portions 28 are provided at an inclined angle relative to the longitudinal direction of an aperture for shower 25 as shown in FIG. 17, or a shape where slit portions 28 are crossed in the shape of X as shown in FIG. 18, so that a rubbing and kneading action and a scraping-away action as described above efficiently exert on the band-like apparatus 11.

Figure 19:
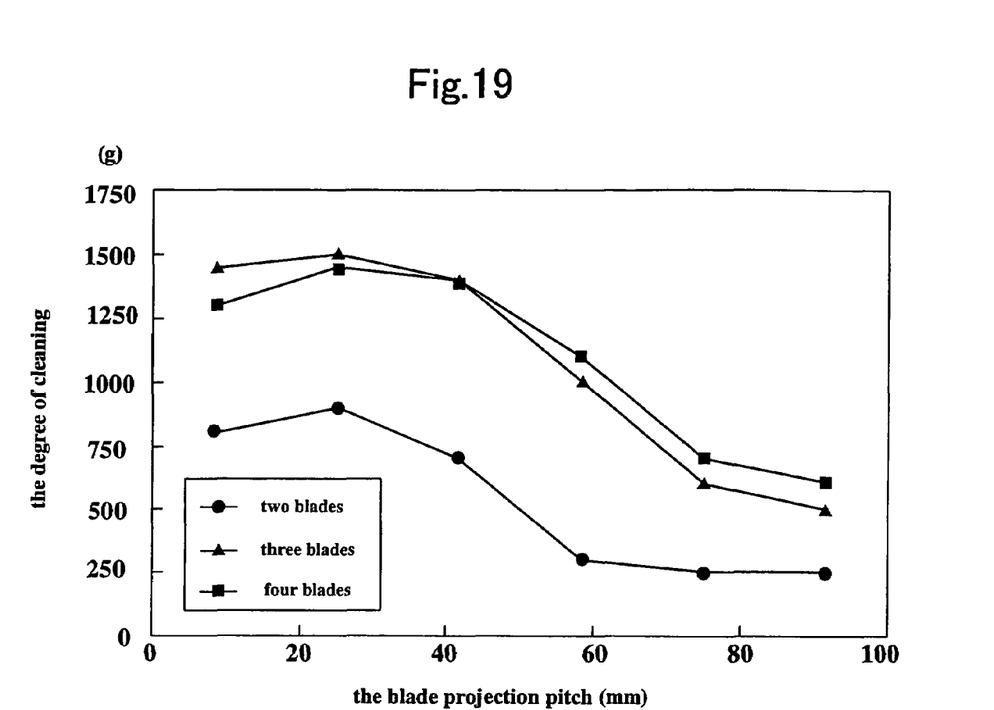
FIG. 19 is a graph showing the relation between the blade projection pitch and the degree of cleaning.
Figure 20:
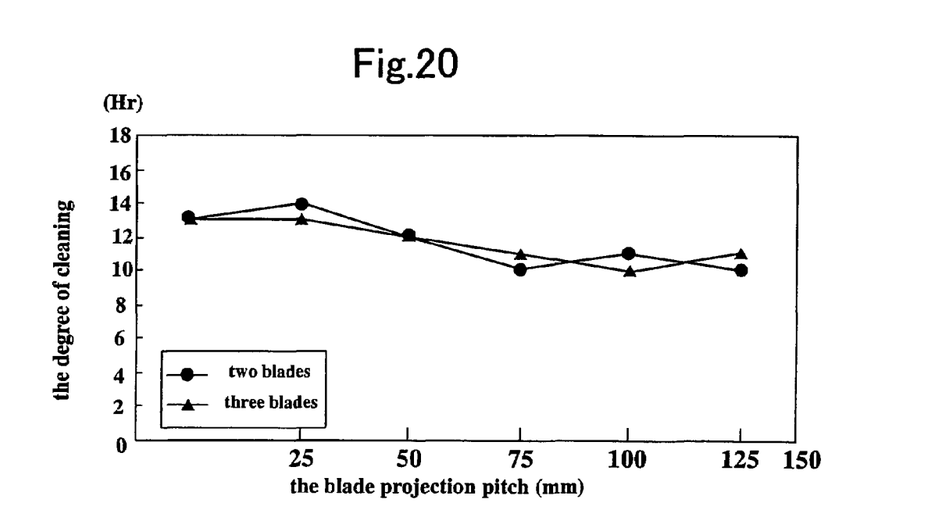
FIG. 20 is a graph showing the relation between the blade projection pitch and the degree of cleaning.

Thereupon, experiments were performed with regard to the relation between the blade projection pitch and the degree of cleaning, varying the number of blade plates 52. As a result, as shown in FIG. 19, the largest amount of foreign materials (about 1500 g) could be collected in case of using three blade plates and a blade projection pitch of 20 to 40 mm, preferably, 30 mm as shown in FIG. 19. And the degree of cleaning was the most preferable in case of the blade projection pitch of 25 mm as shown in FIG. 20.

And since a band-like apparatus 11 can be cleaned uniformly over the whole width of it by providing a plurality of blade plates 52 provided with notches as described above to form a flat single plate having no notches when they are superposed one over another and further providing a flat blade plate, a flat blade plate having no notches may be provided.

And although the present invention adopts stainless steel as a material for a blade plate 52, any kind of materials being proof against a high-temperature and high-humidity environment in a dry part and being rich in corrosion resistance may be used.

And in a band-like apparatus cleaning device 10, a band-like apparatus 11 may be wound partially round a hollow rotating roll 21 setting a dirt-resistant surface of the band-like apparatus 11 as the inner face to be in contact with the hollow rotating roll 21, and may be wound partially round the hollow rotating roll 21 setting a surface of the band-like apparatus 11 as the outer face of the band-like apparatus 11 to be in no contact with the hollow rotating roll 21.

What is claimed is:

1. A cleaning device of device of a band-like apparatus, comprising:
   a hollow rotatably supported roll having a plurality of apertures, and
   cleaning fluid jetting jet nozzles arranged at the inside of the plurality of apertures with the, nozzles cleaning the band-like apparatus that apparatus by jetting a cleaning fluid from the cleaning fluid jetting jet nozzles to the band-like apparatus, wherein the cleaning device provides provides a plurality of blades adjacent to the roll axis of the rotating roll, the band-like the blades functioning in free reciprocation along of the rotating the roll axis.

2. The cleaning device of claim 1, wherein the plurality of blades are arranged in parallel with the roll axis, and each of the blades of the plurality of blades having a plurality of unevenness formed at specified pitches at a side configured to contact the band-like apparatus.

3. The cleaning device of claim 2, wherein each of the blades of the plurality of blades has an unevenness formed at the contact a side with configured to contact the band-like apparatus.

4. The cleaning device of claim 3, wherein three of the plurality of blades are used as blade plates, and at least some of the unevenness are arranged at blade convex pitches of 20 to 40 mm.

5. The cleaning device of claim 1, wherein the apertures are a plurality of elongated narrow holes formed on the rotating roll, and a plurality of slits formed so as to intersect the plurality of elongated narrow holes.

6. The cleaning device of claim 5, wherein the three parallel slits of the plurality of slits are arranged in an oblique direction relative to longitudinal direction of the aperture.

7. The cleaning device of claim 5, wherein the plurality of slits cross one another in the shape of an X relative to the longitudinal direction of the aperture.

8. The cleaning device of claim 1, wherein the band-like apparatus consists comprises a roll for felt in a press part of a paper making stroke, and the width of each of the plurality of slits is in a range of 8 to 12 mm.

9. The cleaning device of claim 1, wherein the band-like apparatus consists of comprises a roll for canvas in a dry part of a paper making stroke, and the width of each of the plurality of slits is in a range of 20 to 22 mm.

10. The cleaning device of claim 1, wherein the band-like apparatus is configured to provide one of a rubbing action and a kneading action.

11. A cleaning device of a band-like apparatus, comprising:
   a rotatably supported hollow roll having a plurality of apertures;
   cleaning fluid jet nozzles arranged at the inside of the plurality of apertures, the nozzles cleaning the band-like apparatus by jetting a cleaning fluid from the cleaning fluid jet nozzles to the band-like apparatus; and
   a plurality of blades adjacent to a roll axis of the rotating roll, the plurality of blades being situated to freely reciprocate in the roll axis direction to brush the band-like apparatus.

* * * * *